United States Patent

[11] 3,626,272

| [72] | Inventor | Peter Pfeffer |
| | | Lauffen, Germany |
| [21] | Appl. No. | 38,270 |
| [22] | Filed | May 18, 1970 |
| [45] | Patented | Dec. 7, 1971 |
| [73] | Assignee | Robert Bosch GmbH |
| | | Stuttgart, Germany |
| [32] | Priority | May 23, 1969 |
| [33] | | Germany |
| [31] | | P 19 26 332.2 |

[54] VOLTAGE REGULATOR ARRANGEMENT
12 Claims, 4 Drawing Figs.

[52] U.S. Cl. ..................................................... 322/28,
322/93, 322/94
[51] Int. Cl. ........................................................ H02p 9/30
[50] Field of Search ............................................ 322/28, 89,
90, 93, 94

[56] References Cited
UNITED STATES PATENTS

| 3,427,529 | 2/1969 | Cummins et al. ............. | 322/28 X |
| 3,443,197 | 5/1969 | Raver et al. .................. | 322/94 X |
| 3,517,296 | 6/1970 | Kuhn ............................ | 322/89 X |
| 3,530,366 | 9/1970 | Schwarm ...................... | 322/28 |

Primary Examiner—T. E. Lynch
Assistant Examiner—H. Huberfeld
Attorney—Michael S. Striker ABSTRACT: A first and second thyristor are connected to the output winding of an alternating-current generator for rectification purposes. The thyristors are switched to a conducting position by control signals furnished by an oscillator alternately to each of the thyristors when the DC output voltage is below a predetermined value.

INVENTOR
Peter PFEFFER
By his ATTORNEY

INVENTOR
Peter PFEFFER
By his ATTORNEY

3,626,272

VOLTAGE REGULATOR ARRANGEMENT

BACKGROUND OF THE INVENTION

This invention relates to a voltage regulator for regulating a direct-current voltage derived from an alternating-current source. In particular it relates to an arrangement wherein a plurality of controllable rectifier means are connected to the output winding of the alternating-current generator, and wherein these controllable rectifier means receive control signals in dependence on the amplitude of the DC output voltage.

Known voltage regulators of the above-described type are employed in regulating the rectified output voltage supplied by permanent magnet generators in motor vehicles. This type of permanent magnet generator in commercial vehicles is driven with varying speed, so that the frequency of the alternating current generator output may vary over a wide range, for example 50 to 300 Hz. Further, the output voltage varies correspondingly, especially due to the connecting and disconnecting of various loads. Thus the output voltage may vary between 20 and 200 volts. Thus high requirements are to be met by the above-mentioned voltage regulators.

Conventional voltage regulators of this type use circuits as shown for example in FIG. 3 of British Pat. No. 1,045,287. Here a single oscillator either oscillates or does not oscillate, depending upon the amplitude of the DC output voltage. This oscillator is used to control all controllable rectifiers which, in the above-mentioned patent, are transistors. If thyristors are used instead of the transistors as is usual today, then the single oscillator serves to control all the thyristors. Under these conditions a drawback of this type of arrangement appears. The thyristors in general do not have the same ignition characteristic. For example one thyristor may light for an ignition voltage of 0.7 volts at an ignition current of 3 to 4 ma, while another thyristor of the same type may require an ignition voltage of 3 volts and an ignition current of 60 ma. As a result, the first, more sensitive thyristor is ignited on the average considerably more often than the second less sensitive thyristor. Thus the first-mentioned thyristor must dissipate much more current and thus heat up to a greater degree. For this type of known voltage regulator it is therefore required that the operating temperature either remain very low or that the thyristors are over designed.

A second drawback of the above-mentioned known voltage regulators is that the single oscillator must supply enough power that it can supply the sum of the ignition power required for all thyristors connected thereto, even though at any given moment only one of these thyristors may require ignition current. Thus the oscillator is required to furnish a large amount of power which increases its cost. This limits the use of permanent magnet generators which are generally used for simple drives as for example in snow scooters, motorcycles or woodsaws, small pumps, etc., that is, apparatus which cannot in general support the cost of an expensive voltage regulator.

SUMMARY OF THE INVENTION

It is an object of the present invention to eliminate the above-mentioned drawbacks and, specifically, to allow a more equal distribution of load for the individual controllable rectifier.

This invention thus comprises a voltage regulator arrangement for a source of alternating-current voltage supplying a direct current load. It comprises first rectifier means having a first control electrode, said first rectifier means having a unidirectional conductive state in response to a first control signal at said first control electrode. Second rectifier means having a second control electrode and adapted to have a unidirectional conductive state in response to a second control signal applied at said second control electrode are also furnished. Interconnecting means interconnect said first and second rectifier means between said source of alternating current voltage and said direct current load. Control signal means furnish a sequence of first control signals to said first control electrode and a sequence of second control signals to said second control electrode in dependence upon the voltage across said direct current load, the times occurrence of said second control signals differing from the times of occurrence of said first control signal.

Since the control signals are applied to the first and second rectifier means at different times, at any time instant only one of these rectifier means, as for example a thyristor, can be ignited. Thus, over a given time period there will in general result a substantially even division of load between the rectifiers and thus substantially equal heating of each of the individual rectifiers. Thus it is not necessary to overdesign any of the rectifier means.

Also, a higher operating temperature may be sustained by the above-described system than by a conventional system.

In a particularly simple embodiment, the control signals are furnished by a blocking oscillator which either furnishes pulses when the direct current output voltage is too low, or blocks when the output voltage exceeds a predetermined value. In a particularly simple and inexpensive embodiment of the invention, the alternating-current generator has an output voltage with a center cap to the extremes of which two controllable rectifiers are connected. The oscillator is embodied in an astable multivibrator. A transformer in connected to the output of the astable multivibrator and each of the control electrodes is connected to an individual secondary winding of said transformer. Rectifiers, additional rectifier means, are connected between the control electrodes and each of the secondary windings in such a manner that if a first control pulse is applied to the first controllable rectifier means, then the subsequent control pulse is applied to the second control rectifier means. Thus, the two control electrodes each receive alternate pulses only. This control is achieved without additional transistors so that actually almost no additional cost is required above the cost of a conventional voltage regulator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
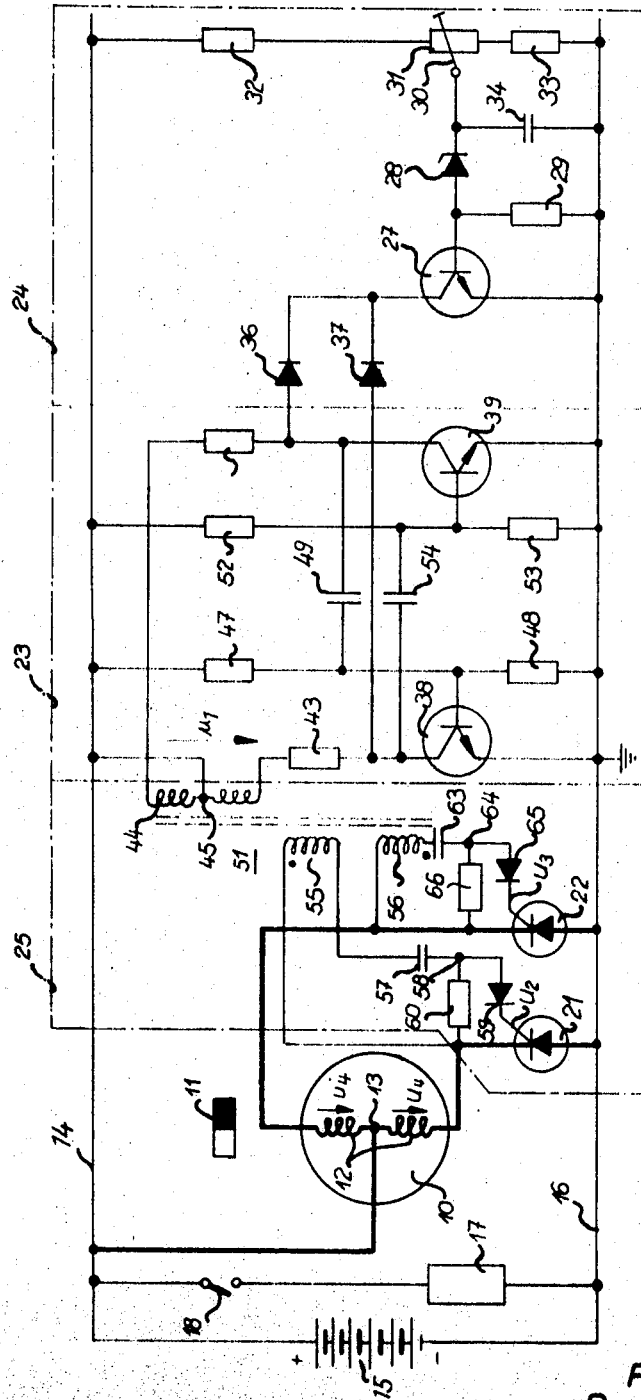
FIG. 1 is a first embodiment showing a single-phase alternating-current generator.

A preferred embodiment of the present invention will now be described with reference to the drawing.

FIG. 1 shows a voltage regulator arrangement for a single phase generator 10 which is activated by a permanent magnet 11. A number of different constructions of such permanent magnet generators are well known in the art.

Generator 10 has an output winding 12 having a center tap 13 which is connected to the positive side of the battery 15 via a line 14. A nominal voltage of, for example 12.6 volts may be furnished by battery 15. This nominal voltage is, in general, the predetermined voltage referred to herein. The battery 15 has a negative terminal connected to a line 16. Line 16 may be grounded for example to the chassis of an automobile in which the invention is utilized. Generator 10 is driven by the motor of the automobile with a corresponding variable speed. A load 17, for example the headlight of the automobile is connected on the one side to ground and on the other side via a switch 18 to the positive voltage line 14.

Output winding 12 has, at its extremities, a first and second output winding to the first of which is connected one embodiment of first rectifier means, namely a thyristor 21, while to the second output terminal is connected one embodiment of the second rectifier means, namely a thyristor 22. When thyristors 21 and 22 are fully conductive, a four-wave rectification takes place. This type of circuit is known as a center tap rectifier circuit.

The control signal furnishing means for furnishing the control signal for causing said thyristors to be in the conductive state are embodied in an oscillator, here an astable multivibrator 23. Oscillator control means, circuit denoted by 24 in FIG. 1, serves to block the oscillations of multivibrator 23 or permit such oscillations, in dependence on the amplitude of voltage between lines 14 and 16, that is in dependence upon the amplitude of the voltage across the direct current load. If this voltage is higher than a predetermined voltage, multivibrator 23 is blocked, while for voltages lower than the predetermined voltage multivibrator 23 is permitted to oscillate.

Figure 2:
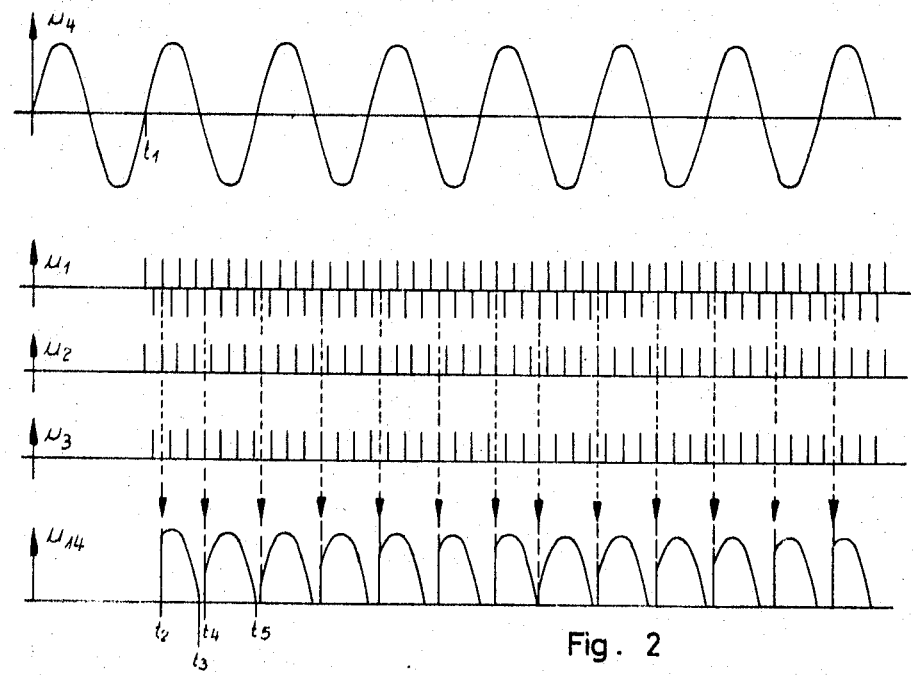
FIG. 2 is a diagram showing voltages as a function of time in the circuit of FIG. 1.

The output pulses of astable multivibrator 23 are shown in the second line from the top in FIG. 2. The pulses are denoted by $u_1$ and are, alternately, positive and negative pulses. Frequency divider means, labeled 25 in FIG. 1, cause two control signal sequences, namely a sequence of first control signals ($u_2$ line 3, FIG. 2) and a sequence of second control signals ($u_3$ line 4, FIG. 2) to be generated. It is seen that the signals in sequence $u_2$ occur at times differing from the times of occurrence of signals in sequence $u_3$ The signals are used, respectively, to control thyristors 21 and 22. Thus the control electrodes of thyristors 21 and 22 never receive a control signal (control pulse) simultaneously. Ignition pulses are supplied to said control electrodes in time sequence but not simultaneously.

The circuit of FIG. 1 will now be described in detail. Oscillator control means 24 comprise an NPN transistor herein referred to as a switching transistor. The emitter of this transistor is connected to ground while its base is connected on the one hand with the anode of Zener diode 28, on the other hand via a resistance 29 to ground. The cathode of Zener diode 28 is connected with the divider terminal 30 of a potentiometer 31 which is part of the voltage divider means. The voltage divider means further comprise a resistor 32 connected from one terminal of potentiometer 31 to line 14, and a resistor 33 connected from the other terminal of potentiometer 31 to ground. Also connected between divider terminals 30 and ground is a capacitor 34. The collector of transistor 27, the switching transistor, is connected with the cathode of diodes 36 and 37. The anode of diode 37 is connected to the collector of a transistor 39 which forms part of the astable multivibrator, while the anode of transistor 37 is connected to the collector of transistor 38 which is also part of the astable multivibrator circuit. Transistors 38 and 39 both have an emitter connected to ground. The collector of transistor 38 is connected via a resistor 43 to one terminal of the primary winding 44 of transformer means comprised in the first circuit means. The center tap 45 of winding 44 is connected to line 14, while the other terminal of primary winding 44 is connected to the collector of transistor 39 via a resistance 46. Resistors 43 and 46 may, for example, be 500-ohm resistors. A capacitor 49 is connected between the collector of transistor 39 and the base of transistor 38, the base of transistor 38 is further connected to line 14 via a resistor 47 and to ground via a resistor 48. Similarly, a capacitor 54 is connected from the base of transistor 39 to the collector of transistor 38. The base of transistor 38 is connected to line 14 via a resistor 52 and to ground via a resistor 53.

As stated above, primary winding 44 is part of the frequency divider means which comprise transformer 51 of which primary winding 44 is the primary. Transformer 51 has a first and second secondary winding, windings 55 and 56, which are wound in opposite directions. This is denoted by the dots in conventional fashion. Secondary winding 55 has one terminal connected to the cathode of thyristor 21, while its other terminal is connected to a circuit point 58 via a capacitor 57. Circuit point 58 is connected to the control electrode of thyristor 21 via additional rectifier means, namely a diode 59. Specifically, the anode of diode 59 is connected to point 58, while its cathode is connected to the control electrode. Similarly, one terminal of winding 56 is connected to the cathode of thyristor 22, while the other terminal is connected to a circuit point 64 via a capacitor 63. Circuit point 64 is also connected to the anode of additional rectifier means, namely the diode 65, whose cathode is connected to the control electrode of thyristor 22. Circuit point 64 is also connected to the first output terminal of output winding 12 via a resistor 66, while circuit point 68 is connected to the second output terminal of output winding 12 via a resistor 60.

Actually, the control circuits of thyristors 21 and 22 are identical, the only difference being that windings 55 and 56 are wound with the opposite polarity. In conjunction with diodes 59 and 55, this opposition in polarity causes control signals to be applied alternatively to the two thyristors, rather than simultaneously, as will be described below.

The arrangement operates as follows:

Let is be assumed that generator 10 is designed to furnish a nominal output voltage of 12 volts at a nominal output current of 12 amperes. Let us further assume that the actual voltage under operating conditions generated by generator 10 is sufficiently large to allow a charging current to flow via thyristors 21 and 22 to the battery 15. As the battery has been charging for a sufficiently long time, its voltage will be relatively high, for example between 13 and 14 volts. Let us further assume that oscillator control means are adapted to operate in such a manner that this voltage is regulated to 13.8 volts, the predetermined voltage in this particular case. It is noted that here the so-called predetermined voltage is somewhat higher than the nominal voltage. A portion of the regulating process is shown in FIG. 2. There, the voltage at battery 15 which has just been charged is sufficiently high to cause Zener diode 28 to conduct, thus causing transistor 27 to become conductive. Its emitter-collector circuit, in series with diodes 36 and 37 respectively then short circuits transistors 38 and 39 respectively, blocking oscillator 23. This in turn blocks thyristors 21 and 22, allowing no current to flow from generator 10 to battery 15. Thus the voltage at battery 15 will eventually drop, for example through discharge through a load.

At time $t_1$ the voltage at battery 15 has decreased sufficiently that Zener diode 28 is in the nonconductive state. Time period $t_1$ is indicated in the upper line of FIG. 2, in which the voltage $u_4$ is shown. This is the voltage which is developed across both parts of winding 12 of generator 10 when the generator is turned at a relatively slow speed. In actual operation this voltage will decrease when generator 10 is loaded. This is not shown in FIG. 2.

When Zener diode 28 blocks, transistor 27 blocks causing diodes 36 and 37 to be nonconductive. Thus astable multivibrator 23 is no longer blocked and, as is shown in the second row from the top of FIG. 2, will furnish a series of alternately positive and negative pluses $u_n$ whose frequencies (sum of positive and negative pulses may, for example be 1,000Hz. Each of these pulses per second may for example, correspond to a collector current in transistor 38 or 39 of 20 ma. Transformer 51 may have a turns ratio of 10 : 6(output turns 44 : 100 +100 turns; secondary turns 55 and 56 : each 60 turns). Thus a current of approximately 30 ma will flow in the control circuit of thyristors 21 and 22, alternatively, not simultaneously. For the type of transistor used, proper operation is then assured to $-40°$ C.

Astable multivibrator operates in such a way, that one of the two transistors is abruptly switched to the conductive state and remains there for a short time. If transistor 30 is conductive, a current flows through the upper portion of winding 44, generating, for example, a positive pulse in secondary winding 55 which is applied to the gate of transistor 21 via diode 59 and there acts as a positive ignition pulse (control signal)$u_2$. However the pulse induced in secondary winding 56 is a negative pulse which is blocked by diode 65 so that the gate of thyristor 22 does not receive an ignition pulse.

If however transistor 38 is conductive then current flows through the lower part of winding 44, inducing a negative pulse in secondary winding 55 and a positive pulse in secondary winding 56. Thus in this case thyristor 22 receives an ignition pulse $u_3$.

Thus the first circuit means comprising transformer 51 as well as the control circuit of thyristors 21 and 22 act in a sense as a frequency divider and prevent simultaneous ignition of thyristors 21 and 22. Thus only the ignition power for one thyristor must be generated at a time, and not the power for both thyristors as is the case in conventional regulators of this type. Thus oscillator 23 must supply only half the power required in the conventional regulating circuit.

In the lowest line of FIG. 2, the voltage between lines 14 and 16 upon ignition of both thyristors 21 and 22 is shown. For purposes of clarity, this voltage is illustrated for the case in which battery 15 is disconnected. (In operation, battery 15 acts as a large capacitor between lines 14 and 16).

As is shown in FIG. 1, thyristor 21 can only be ignited by pulses $u_2$, while thyristor 22 can only be ignited by pulses $u_3$. At a time $t_2$ the voltage across thyristor 21 is positive and an ignition pulse $u$ is present, so that this thyristor is ignited and remains conductive until time $t_3$ at which its anode potential becomes negative. At time $t_4$ the voltage across thyristor 22 is positive and an ignition pulse $u_3$ is present, so that this thyristor is ignited and remains conductive till time $t_5$. This process repeats continually. The ignition time, relative to the phase of the AC output voltage varies as is indicated in the lowest line of FIG. 2. However, the time average of the load of thyristors 21 and 22 is almost completely equal, so that neither of them must be overdesigned.

When thyristors 21 and 22 are conductive, a load current flows from generator 10 to battery 15. In practice, it has been shown that generally after 8 to 10 periods of the AC voltage, the voltage at the battery has increased sufficiently that Zener diode 28 again becomes conductive and that thyristor 21 and 22 again blocks for the duration of a few periods. The cycle thus repeats continually, maintaining the voltage across battery 15 very closely at the value set by the variable arm of potentiometer 31.

Figure 3:
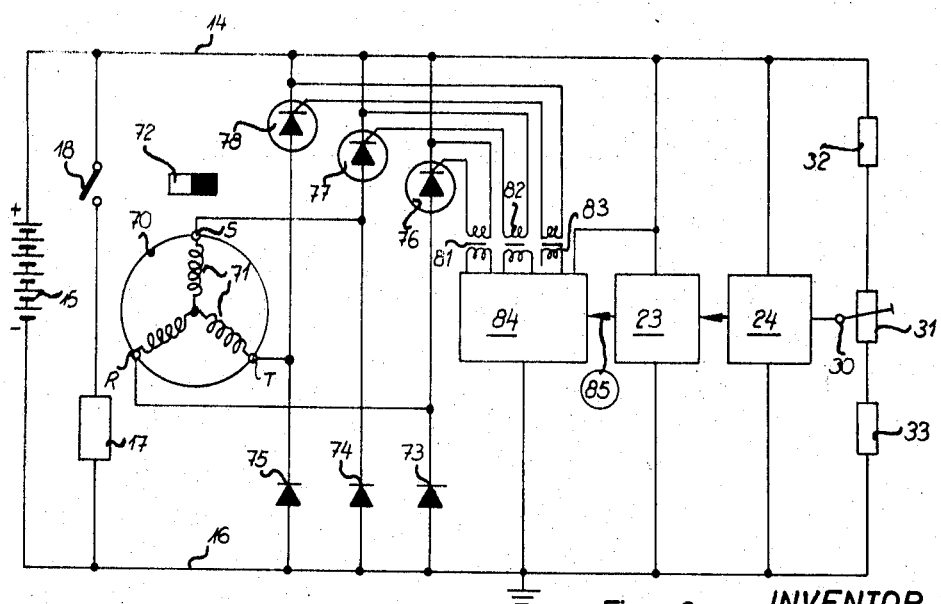
FIG. 3 is an alternate embodiment showing a three-phase alternating-current generator.

FIG. 3 shows an embodiment of the invention using a voltage regulator for a three-phase generator 70 having three phase windings 71 and, similarly to generator 10, energized by a permanent magnet 72. The same or similarly operating components as in FIG. 1 have the same reference numbers in FIG. 3 and will not be described again.

Figure 4:
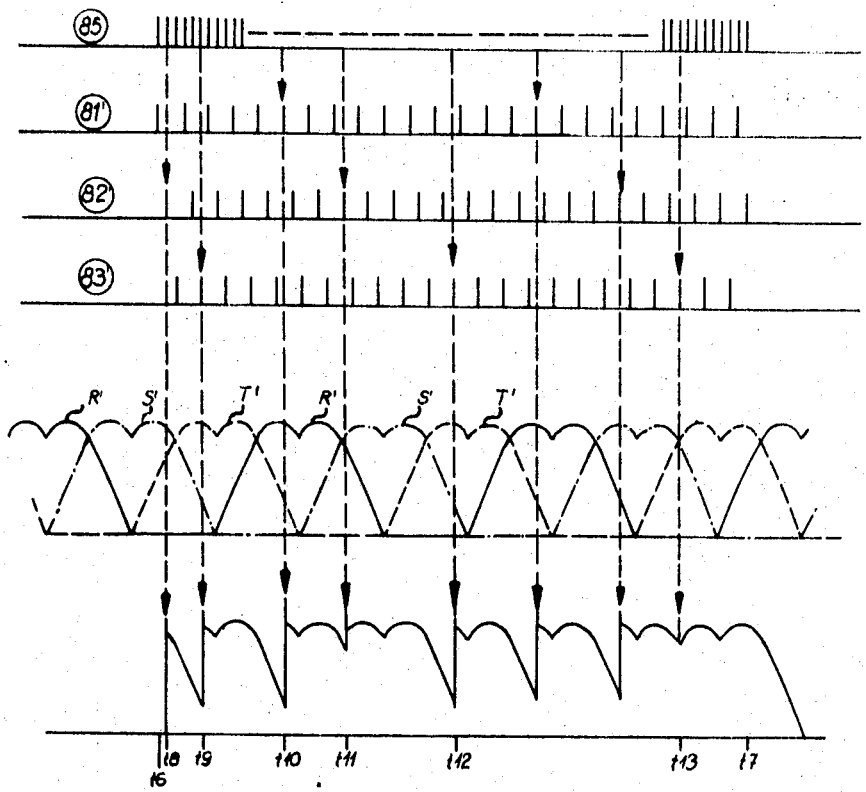
FIG. 4 is a diagram or use in explaining the arrangement according to FIG. 3.

Terminals P, S, and T of three phase winding 71 are connected to ground via diodes 73, 74 and 75, respectively, and to positive line 14 via thyristors 76, 77, and 78 respectively. The output windings of pulse transformers 81, 82, 83 are connected in the cathode-gate circuit of thyristors 76, 77 and 78 respectively. The primary windings corresponding to secondary 81, 82 and 83 are each connected to one output of a circuit 84 which functions as frequency divider means and is embodied in a ring counter. One embodiment of such a ring counter can be found in "Digital Components and Circuits" by R. T. Richards; D. Van Nostrand Co., Inc., publisher, on page 447, Figure 10–6(b). In operations, a pulse sequence appears at each of these outputs which is out of phase with the pulse sequence at each of the other outputs, whenever oscillator 23 is in the oscillating phase, that is when oscillator 23 is not blocked by oscillator control means 24. Actually, oscillator 23 and oscillator control means 24 can be identical to the same circuit used in FIG. 1. Ring counter 84 is a well-known circuit which receives pulse sequence 85, shown in the top line of FIG. 4 from oscillator 23 and effectively frequency divides this pulse sequence by a factor of three. Thus pulse sequences 81', 82' and 83' appear at the respective outputs of the ring counter, as shown in FIG. 4 in the second, third and fourth line from the top. It is clearly seen that each of the pulse sequences has pulses occurring at times which differ from the times of occurrence of all the other pulse sequences. Thus none of the three thyristors 76, 77 and 78 receive an ignition pulse simultaneously. Rather, each one receives an ignition pulse individually.

In the fifth row from the top of FIG. 4 are shown voltages R', S', and T' measured on an oscillograph. That is, these are the waveforms when the voltages between R, S and T, and ground are measured. It will be noted that these voltages differ from the normal sign wave in that they are positive during approximately two-thirds of the period and are at ground potential (or slightly negative) because of the voltage drop across rectifiers 73 to 75 during one-third of the period. Thus the individual phases R', S' and T' overlap considerably, as shown in FIG. 4.

Because of this overlap, at least two of the thyristors 76, 77 and 78 are ready simultaneously for ignition, that is, the anode of at least two of them is positive simultaneously for ignition, that is the anode of at least two of them is positive simultaneously. If now an ignition pulse is furnished simultaneously to all three thyristors as is the case in known voltage regulators, then of the two thyristors which are ready for ignition, that one will ignite which requires the least ignition power. As described above, wide differences exist between individual thyristors of the same type, as far as required ignition power is concerned. Because of these differences, the thyristor requiring the lowest ignition power will always ignite first and take over the load current. Thus one thyristor will tend to be loaded considerably more than the other. This uneven distribution load necessitates that all thyristors be overdesigned.

Use of the frequency divider means 84 eliminates this drawback in that only one of the three thyristors will receive an ignition pulse at any given time. This thyristor will then carry the load current when the other conditions for a switching of load current are present.

We again refer to FIG. 4. At time $t_6$, oscillator 23 begins to oscillate since the voltage at battery 15 has decreased considerably. A pulse sequence 85 then appears at the output of oscillator 23. This pulse sequence may have the frequency of, for example, 1,500 Hz. The oscillator ceases oscillating at time $t_7$ causing the pulse sequence to be interrupted at this point.

The first pulse sequence 81' appearing at output 81 of first circuit means 84 controls thyristor 76 connected to the R phase, phase sequence 82' appearing at output 82 controls thyristor 77 connected to phase S, while sequence 83' controls thyristor 78 which is connected to the phase T. At time $t_6$ a pulse of the sequence 81' is generated. However, since no voltage appears across phase R, thyristor 76 cannot ignite. Next, at time $t_8$, a pulse of sequence 82' is generated. Since a positive voltage appears across thyristor 77 at this time this thyristor ignites and remains in the conductive state until time $t_9$ at which the voltage across phase T exceeds that across phase S. A pulse from pulse sequence 83' then ignites thyristor 78 and the current is transferred from thyristor 77 to thyristor 78. Next, at time $t_{10}$, thyristor 76 is ignited through a pulse from pulse sequence 81. Subsequently, at time $t_{11}$, thyristor 77 is reignited and at time $t_{12}$ thyristor 78. Lastly, at time $t_{13}$, thyristor 78 is ignited and remains lit until the voltage at its anode returns to zero.

It should be noted that the diagram in the last line of FIG. 4 is also taken under condition of a disconnected battery, in order to facilitate explanation. As becomes evident from examination of FIGS. 2 and 4, the frequency of the ignition pulses should be at least as high as the highest frequency of the output voltage of the generators 10 or 70. Preferably, this frequency is considerably higher.

It should be evident that the system of the present invention allows an even distribution of load upon the three thyristors 76, 77 and 78, while utilizing simple circuitry and an inexpensive voltage regulated permanent magnet generator.

With further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Voltage regulator arrangement, comprising, in combination, a source of AC voltage; a direct-current load; a plurality of rectifier means each having a control electrode, each of said rectifier means having a unidirectional conductive state in response to a control signal at said control electrode; an oscillator furnishing a sequence of oscillator signals when in an oscillating state; oscillator control means interconnected between said direct current load and said oscillator, for controlling the state of said oscillator as a function of load voltage; and frequency divider means having an input connected to the output of said oscillator and a plurality of outputs, each connected to one of said control electrodes, said frequency divider means applying said oscillator signals in said sequence of oscillator signals to said plurality of said control electrodes in a predetermined cyclic order.

2. A voltage regulator arrangement as set forth in claim 1, wherein said oscillator control means blocks said oscillator when said voltage across said direct current load exceeds a predetermined voltage.

3. A voltage regulator arrangement as set forth in claim 2, wherein said oscillator control means comprise a switching transistor connected to said oscillator means in such a manner that the oscillations of said oscillator are block when said switching transistor is in the conductive state; and wherein said oscillator control means further comprise circuit means interconnected between said direct-current load and the base of said switching transistor in such a manner that said transistor is in the conductive state or in the nonconductive state in dependence upon the voltage across said direct-current load.

4. A voltage regulator arrangement as set forth in claim 3, wherein said circuit means comprise voltage divider means having a divider terminal; and a Zener diode connected between said base of said switching transistor and said voltage divider terminal in such a manner that said switching transistor is in the conductive state when the voltage at said divider terminal exceeds a voltage corresponding to said predetermined voltage.

5. A voltage regulator arrangement as set forth in claim 1, wherein said source of AC voltage comprise a single phase AC generator having an output winding, said output winding having a first and second output terminal and a center tap; wherein said plurality of rectifier means comprise first and second rectifier means each having a first and second main electrode; and wherein said interconnecting means interconnects said first main electrode of said first rectifier means to said first output terminal, said first main electrode of said second rectifier means to said second output terminal, and said direct-current load between said second main electrodes connected in common and said center tap.

6. A voltage regulator arrangement as set forth in claim 5, wherein said oscillator is an astable multivibrator.

7. A voltage regulator arrangement as set forth in claim 6, wherein said frequency divider means comprise transformer means having a primary winding connected to the output of said astable multivibrator and a first and second secondary winding respectively connected between the first main electrode and the control electrode of said first rectifier means and the corresponding points of said second rectifier means.

8. A voltage regulator arrangement as set forth in claim 7, further comprising first and second additional rectifier means, respectively interconnected between said first secondary winding and said first control electrode, and said second secondary winding and said second control electrode.

9. A voltage regulator arrangement as set forth in claim 8, wherein said astable multivibrator comprises a first and second transistor, each of said transistors having a collector, said collectors being connected to opposite extremes of said primary winding; wherein said primary winding has a center tap; wherein at least part of said direct current load is a battery having a positive and negative terminal; and wherein the center tap of said primary winding is connected to said positive terminal of said battery.

10. A voltage regulator arrangement as set forth in claim 1, wherein the frequency of the AC voltage furnished by said source of AC voltage varies up to a predetermined maximum frequency; and wherein the frequency of said control signals applied to any of said control electrodes is at least equal to said maximum frequency.

11. A voltage regulator arrangement as set forth in claim 15, wherein said source of AC voltage is a three-phase source; wherein said plurality of said rectifier means comprise three rectifiers, one in each of said phases; and wherein said frequency divider means furnish a frequency division by a factor of 3, thereby applying every third oscillator signal to the same one of said control electrodes.

12. A voltage regulator arrangement as set forth in claim 11, wherein said frequency divider means comprise a ring counter.

* * * * *